US012647883B2

(12) United States Patent
De et al.

(10) Patent No.: US 12,647,883 B2
(45) Date of Patent: Jun. 2, 2026

(54) SYSTEM AND METHOD FOR PROVIDING ENERGY MANAGEMENT IN COMMUNICATION NETWORK

(71) Applicant: INDIAN INSTITUTE OF TECHNOLOGY DELHI, New Delhi (IN)

(72) Inventors: Swades De, New Delhi (IN); Ashutosh Balakrishnan, New Delhi (IN); Krishna Sirohi, New Delhi (IN); Debashis Mitra, New Delhi (IN)

(73) Assignee: INDIAN INSTITUTE OF TECHNOLOGY DELHI, New Delhi (IN)

( * ) Notice: Subject to any disclaimer, the term of this patent is extended or adjusted under 35 U.S.C. 154(b) by 769 days.

(21) Appl. No.: 18/061,249

(22) Filed: Dec. 2, 2022

(65) Prior Publication Data

US 2023/0180125 A1 Jun. 8, 2023

(51) Int. Cl.
*H04W 52/02* (2009.01)
*H04W 28/02* (2009.01)

(52) U.S. Cl.
CPC ... *H04W 52/0206* (2013.01); *H04W 28/0226* (2013.01)

(58) Field of Classification Search
CPC . H04W 52/00; H04W 52/02; H04W 52/0206; H04W 28/0226; H04W 28/02; H04W 28/00
See application file for complete search history.

(56) References Cited

U.S. PATENT DOCUMENTS 8,831,672 B2 9/2014 Frenger et al.
10,317,924 B2 6/2019 Schwarz et al.
(Continued)

FOREIGN PATENT DOCUMENTS

EP 3182774 A1 * 6/2017 ........... G01S 5/0269
JP 6250736 B2 12/2017

OTHER PUBLICATIONS

Techno-Economic Feasibility of Hybrid Solar Photovoltaic and Battery Energy Storage Power System for a Mobile Cellular Base Station in Soshanguve, South Africa—Banjo A. Aderemi 1, S. P. Daniel Chowdhury, Thomas O. Olwal and Adnan M. Abu-Mahfouz (Year: 2018).*

(Continued)

*Primary Examiner* — Jinsong Hu
*Assistant Examiner* — Farideh Madani
(74) *Attorney, Agent, or Firm* — GREENBERG TRAURIG, LLP

(57) ABSTRACT

Disclosed is system (100) and method (200) for providing energy management in communication network (700). The system (100) comprises a plurality of the solar-enabled Base Stations (BSs) (300-*n*) connected to a power grid (600) and a core network (800) configured in the communication network (700). The core network (800) comprises a controller (102) configured for enabling energy exchange among the energy-deficient BS from the plurality of BSs (300-*n*) and energy-sufficient BS from the plurality of BSs (300) through the power grid (600), thus reducing the carbon footprint. The controller (102) is also configured for cooperatively adjusting network coverage area for each of the BS of the plurality of BSs (300-*n*). The power grid (600) operates in an energy prosumer mode, providing flexibility to the plurality of BSs (300-*n*) to procure energy from it to avoid energy outage or sell surplus energy back to the grid.

17 Claims, 4 Drawing Sheets

(56) References Cited

U.S. PATENT DOCUMENTS

2012/0252525 A1 * 10/2012 Frenger .................. H02J 3/144
455/524
2014/0256330 A1 * 9/2014 Liu ....................... H04W 88/08
455/446

OTHER PUBLICATIONS

Techno-Economic Feasibility of Hybrid Solar Photovoltaic and Battery Energy Storage Power System for a Mobile Cellular Base Station in Soshanguve, South Africa—Banjo A. Aderemi 1, S. P. Daniel Chowdhury, Thomas O. Olwal and Adnan M. Abu-Mahfouz—Jun. 15, 2018.

* cited by examiner (200)

Configuring, a plurality of the solar-enabled Base Stations (BSs) connected to a power grid in the communication network          (202)

Enabling, through a controller each of energy exchange between one BS with other BSs          (204)

Selectively, activates an energy cooperation (EC) model or Energy Cooperation and Coverage Adjustment (ECCA) model          (206)

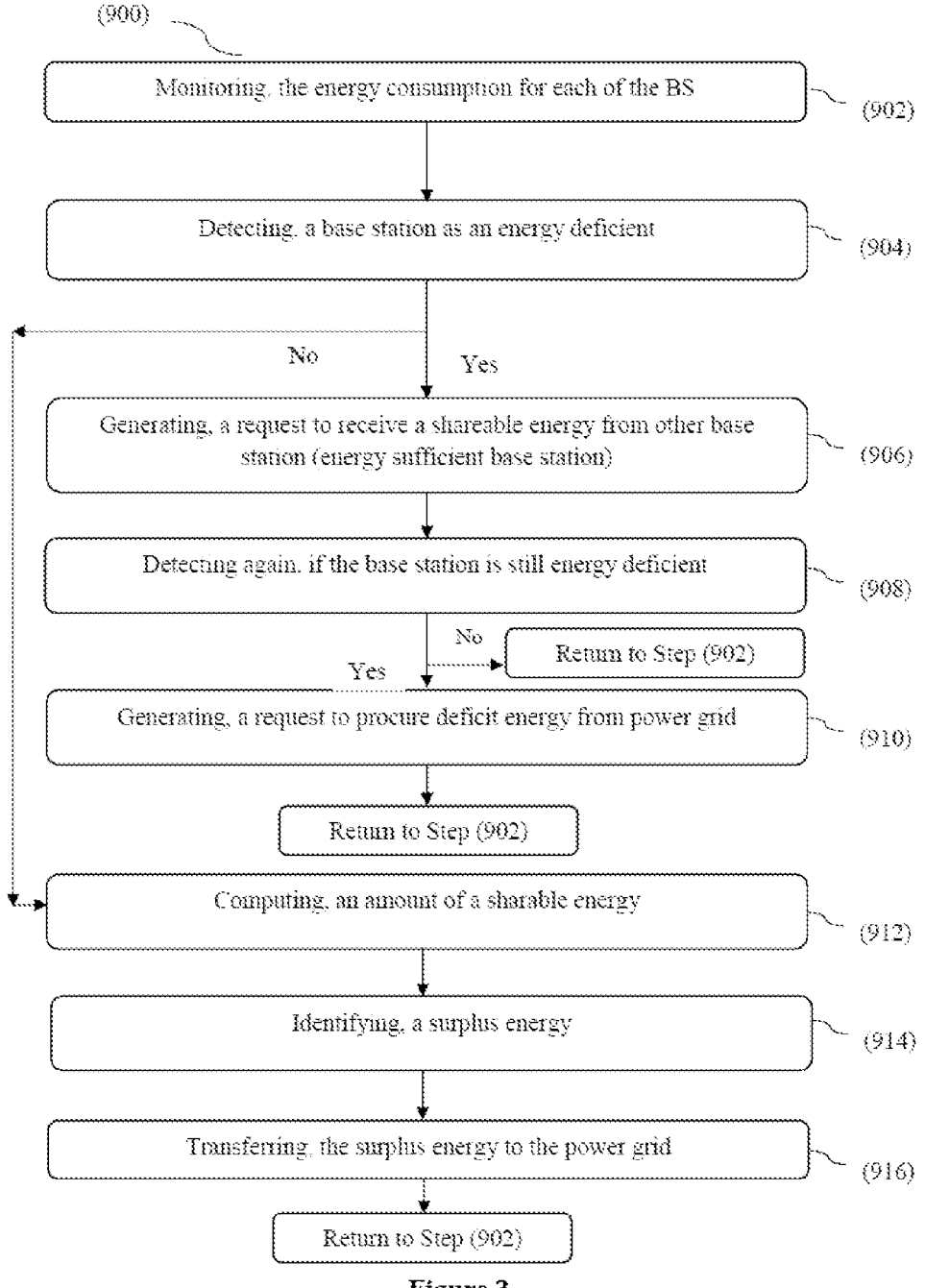

(900)

Monitoring, the energy consumption for each of the BS — (902)

Detecting, a base station as an energy deficient — (904)

No          Yes

Generating, a request to receive a shareable energy from other base station (energy sufficient base station) — (906)

Detecting again. if the base station is still energy deficient — (908)

No          Return to Step (902)

Yes

Generating, a request to procure deficit energy from power grid — (910)

Return to Step (902)

Computing, an amount of a sharable energy — (912)

Identifying, a surplus energy — (914)

Transferring, the surplus energy to the power grid — (916)

Return to Step (902)

Monitoring, the energy consumption for each of the BS.          (1002)

Detecting, a base station as an energy deficient          (1004)

No

Return to Step (1002)

Yes

Initiating, an exemplary energy cooperation (EC) model
*(Execution of the steps (902) to (916))*          (1006)

Performing a cooperative coverage adjustment          (1008)

SYSTEM AND METHOD FOR PROVIDING ENERGY MANAGEMENT IN COMMUNICATION NETWORK

CROSS-REFERENCE TO RELATED APPLICATIONS AND PRIORITY

The present application claims priority to Indian application no. 202111056238, filed on Dec. 3, 2021

TECHNICAL FIELD

Embodiments of the present invention relate to energy management, and more particularly to energy management in communication network.

BACKGROUND

With an advent of Internet of Things (IoT) devices, there is a huge increment in data traffic and accordingly data requirements from user have increased drastically. The proliferation of the IoT devices alongside the rollout of 5G communications is expected to increase the number of Base Stations (BSs) in a network to cater to the user Quality of Service (QoS), thus increasing the network energy consumption. These BSs being energy intensive devices are estimated to generate a large amount of the carbon footprint in the Information and Communication Technology (ICT) sector.

The existing solutions like purely renewable enabled BSs, optimal resource allocation and traffic management techniques (dynamic BS ON/OFF or cell zooming methods) are costlier, complex in nature, and are unable to utilize surplus energy generated by renewable sources. In practice, the BS loads are not always balanced. There might develop a scenario in the network such that some BSs experience a higher traffic and data requirements, thus requiring a higher energy to serve the user-traffic. Simultaneously some BSs in the network may be experiencing a comparatively lower user-traffic, thus having some surplus unutilized energy. Likewise, the energy generation rate, and hence the net energy availability, at the BSs may also cause traffic-energy imbalance.

Traditionally, off-grid diesel powered BSs are installed to facilitate communication in rural areas and such BSs are estimated to consume extremely high quantity of diesel per month. The upcoming use-cases of 5G are expected to have high-density Massive Machine Type Communication (mMTC) requirements as a backbone for smart infrastructure. Such upcoming use cases with huge energy requirements are estimated to lead to an exponential rise in network energy consumption. Therefore, there is growing need to reduce the carbon footprint in the ICT sector to achieve the vision of green communication. Further, in addition to energy, revenue is also a crucial parameter to further telecommunication in the rural parts of the nation. Hence, revenue as well as energy centric solutions are required to expand the ICT sector.

BRIEF DESCRIPTION OF THE DRAWINGS

The foregoing summary, as well as the following detailed description of embodiments, is better understood when read in conjunction with the appended drawing. For the purpose of illustrating the disclosure, there is shown in the present document example constructions of the disclosure, however, the disclosure is not limited to the specific methods and apparatus disclosed in the document and the drawing.

The detailed description is described with reference to the accompanying figure. In the figure, the leftmost digit(s) of a reference number identifies the figure in which the reference number first appears. The same numbers are used throughout the drawing to refer to features and components.

FIG. 3 illustrates a flowchart of an exemplary Energy Cooperation (EC) model, in accordance with an embodiment of the invention.

SUMMARY

Figure 1:
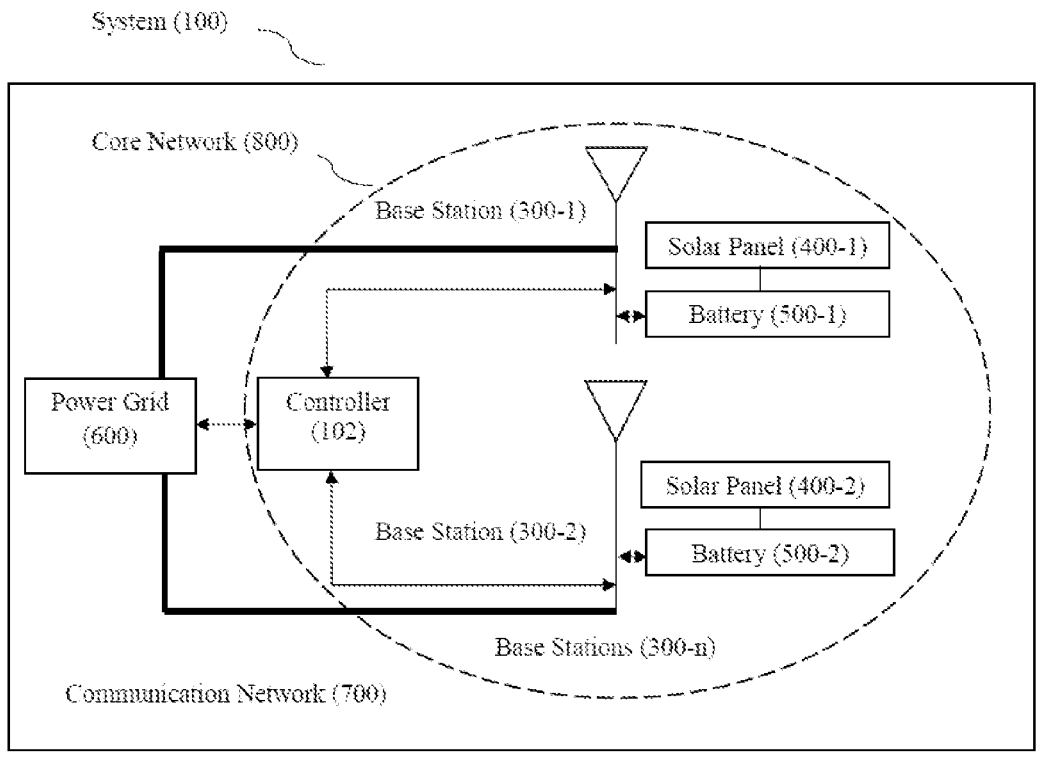
FIG. 1 illustrates a system providing energy management in a communication network, in accordance with different embodiments of the invention.

Before presenting the system providing energy management in a communication network, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to system and method for providing energy management in a dual-powered communication network. This summary is not intended to identify essential features of the claimed subject matter, nor is it intended for use in determining or limiting the scope of the claimed subject matter.

In one implementation, a system providing energy management in a communication network is disclosed. The system comprises a plurality of the Base Stations (BSs) connected to a power grid and a core network configured in the communication network. Each BS of the plurality of BSs is solar enabled with a plurality of solar panels and storage batteries. The core network comprises a controller configured for enabling energy exchange among the energy-deficient BS from the plurality of BS and energy-sufficient BS from the plurality of BSs through the power grid. The controller is also configured for cooperatively adjusting network coverage area for each of the BS of the plurality of BSs, following the cooperative energy exchange.

In another implementation, a method for providing energy management in a communication network is disclosed. The method comprises configuration of a plurality of the Base Stations (BSs) to a power grid in the communication network. Each BS of the plurality of BS is solar enabled with a plurality of solar panels and storage batteries. A controller at the core network enables each of energy exchange between one BS with other BSs. The controller is also configured for cooperatively adjusting network coverage area for each of the BS of the plurality of BSs, following the cooperative energy exchange.

DETAILED DESCRIPTION

Some embodiments of the present disclosure, illustrating all its features, will now be discussed in detail. The words "comprising", "receiving", "determining", "generating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice of embodiments of the present disclosure, the exemplary system providing energy management in a dual-powered communication network. The disclosed embodiments of system and method for providing energy management in a dual-powered communication network are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for the system and the method for providing energy management in a dual-powered communication network thereof is not intended to be limited to the embodiments illustrated, but is to be accorded the widest scope consistent with the principles and features described herein.

In accordance with an embodiment, referring to FIG. 1, a system (100) providing energy management in a communication network (700) is shown. A plurality of the Base Stations (BSs) (300: 300-1, 300-2 . . . **300-*n*) are connected to a power grid (600) and a core network (800) is configured in the communication network (700). Each BS (300) of the plurality of BSs (300) is solar enabled. A plurality of solar panel (400: 400-1; 400-2 . . . 400-*n*) is configured with a plurality of batteries (500: 500-1, 500-2 . . . 500-*n*) to harness the solar power. The batteries (500) are configured to have a net finite storage capacity for storing energy and the solar panels (400) for harvesting energy. The Base stations (300) are solar enabled and powered with power grid (600). Thus, the Base stations (300**) are dual-powered.

Further, the batteries (500: 500-1, 500-2 . . . **500-*n*) are configured within the base stations (300) to supply the solar harvested power to the base stations (300). The core network (800) comprises a controller (102) configured for enabling energy exchange among energy-deficient BS (300) from the plurality of BS (300-*n*) and energy-sufficient BS (300) from the plurality of BS (300-*n*) through the power grid (600). Further, the BS (300) is identified to be the energy-deficient BS in case the battery level of the BS (300) is detected below a predefined threshold value while fulfilling the user QoS. The BS (300) is identified to be the energy-sufficient BS in case the battery level of the BS (300) is detected between the predefined threshold value and a total storage capacity level of the BS (300**) after fulfilling the user QoS. The predefined threshold value of storage capacity is subjectively chosen by the operator or service provider depending on number of battery charging-discharging cycles and depth of discharge.

The controller (102) is also configured for adjusting network coverage area for each of the BS (300) of the plurality of BSs (**300-*n*). The control signalling between the BSs (300) and the controller (102) is enabled through dedicated, optical fiber backhaul links (not shown). Hence, the existing communication resource (bandwidth) used for serving users through the BS (300) remains unaffected in the system (100**).

The controller (102) is configured to control the energy exchange among the energy-deficient BSs (300) and the energy-sufficient BSs (300) depending on spatio-temporally varying stochastic energy harvest and stochastic BS traffic intensity. The net energy present with the energy-sufficient BS (300) comprises a difference between a predefined threshold value and the total storage capacity level, and is termed as a sharable energy available at the BS (300).

The optimum solar panel (400) and the battery (500) dimensioning is selected according to an average traffic and the energy availability statistic at each of the BS (300) in the communication network (700). The energy is shared according to the timely stochastic energy harvest at the BS (300) and dynamically varying load experienced at the base station. The leftover energy is computed as the difference of harvest and the BS load. In case the leftover energy is negative, that signifies that the amount of energy is needed to prevent an energy outage at the BS (300) and if the leftover energy is positive, that signifies that the amount of surplus energy present with the BS (300) may be shared amongst other BSs at any time.

Further, a probability distribution function (PDF) of the leftover energy is determined statistically using non-parametric machine learning techniques. The mean of the PDF signifies the minimum number of solar panels required for the BS. The negative portion of the PDF, signifying negative leftover energy, is used to compute the optimum number of storage batteries required.

Furthermore, to prevent the energy-deficient BS (300) from getting into energy outage state, the controller (102) keeps on checking for availability of the energy-sufficient BSs (300) in real-time, and the sharable energy is transferred to the energy-deficient BS (300) through the power grid (600). If the net sharable energy in the network is not sufficient to meet or match the net energy deficiency of a BS (300), the BS (300) procures energy from the power grid (600) to avoid an energy outage.

The BS (e.g., 300-1) is configured for receiving, the energy from the other BSs (e.g., 300-2) through the power grid (600), when the stored energy is lower than the predefined threshold value. The BSs (300) transfers the energy to the other BSs (**300-*n*) through the power grid (600**), when the stored energy is higher than the predefined threshold.

Furthermore, in the system (100) the energy exchange comprises one of transferring energy from the energy-sufficient BSs (300) to other BSs (**300-*n*) (may also be referred as energy deficient BS) in the communication network (700), or receiving the energy from the energy-sufficient BSs to other BSs (300-*n*) (may also be referred as energy deficient BS) in the communication network (700**).

In the system (100), the controller (102) is configured for monitoring spatio-temporal variation of a traffic at each of the BS (300) in the communication network (700). The controller (102) cooperatively adjusts the network coverage for each of the BS (300-1, . . . , **300-*n*) according to the spatio-temporally varying traffic intensity and availability of energy stored in the BS (300). The adjusting comprises one of an increasing the coverage area or decreasing the coverage area. The cooperative coverage adjustment follows the energy sharing among the BSs (300**).

Furthermore, in the system (100), the controller (102) is configured for monitoring, in case energy stored in the BS (300) is more than the predefined value and then the BS (300) is considered as the energy-sufficient BS (300) or else the BS (300) is considered as the energy deficient BS (300). The controller (102) receives request for sharing energy by the energy deficient BSs (300) in the communication network (700). The request is generated when the BS (300) is energy-deficient. The communication network (700) comprises one of a similar communication network for the other
BSs (300-*n*) requesting for sharing energy and BS (300)
transferring the energy or a different communication net-
work for the other BSs (300-*n*) requesting for sharing energy
and the BS (300) transferring the energy. The controller
(102) transfers the energy from the energy-sufficient BS
(300) to other energy deficient BS.

Furthermore, in the system (100), the controller (102) is
configured for monitoring the energy consumption for each
of the BS (300). The energy consumption comprises a
dynamic energy consumption for serving an associated user
and a static energy consumption for running the BS (300).
The controller (102) is also configured for determining a
level of the battery (500) of the BS (300) according to the BS
(300) energy consumption and stochastic energy harvest.
The stochastic energy harvest varies spatio-temporally
throughout the time period (e.g., day or predefined time) and
is influenced by the climatic conditions, and the stochastic
BS (300) traffic intensity, also varies spatio-temporally,
depends on the number of active users associated with the
BS (300) and the QoS requirements.

Furthermore, the communication network (700) com-
prises one of a 3G network, a 4G network, and a 5G
network. For the 3G network, the controller (102) comprises
a Radio Network Controller (RNC) configured as an opera-
tive part of an Operation Maintenance Center (OMC) and
the plurality of BSs (300-*n*) are clustered. For the 4G
network, an evolved packet core (EPC) is an operative part
of the OMC and a pluralities of BSs (300-*n*) comprising
eNBs (evolved NodeBs) are clustered. For the 5G network,
a Radio Access Networks (RAN) is an operative part of the
OMC and a plurality of the BSs (300-*n*) comprising gNodeB
or gNB are clustered. The controller (102) is a part of OMC.

The system (100) represents a dual-powered network
designed to improve utilization of temporal network energy
and thus minimize an operational expenditure of plurality of
mobile network operator as well as carbon footprint in
communication network operation. A dual-powered network
may be defined as a network in which the networked base
stations (300) are powered through two energy sources. We
consider individual base stations (300) to be solar-enabled
and power-grid connected. Thus, the system (100) may
perform into energy prosumer mode of power grid (600).
Energy prosumer mode of power-grid operation is defined as
a scenario in which the power-grid acts as an energy
producer (BSs can procure energy from the grid) or energy
consumer (BSs can transfer surplus energy to the grid).

Figure 2:
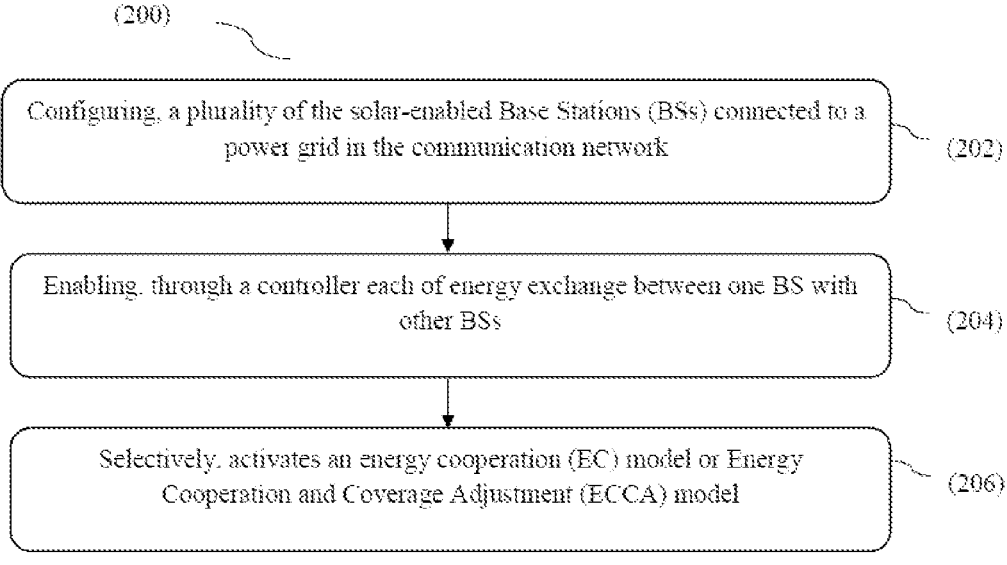
FIG. 2 illustrates a flow chart for a method providing energy management in a communication network, in accordance with different embodiments of the invention.

FIG. 2 illustrates a flow chart of a method (200) for
providing energy management in the communication net-
work is shown. At step 202: The Base Stations (BSs) (300)
are connected to a power grid (600) in the communication
network (700). Each BS (300) of the plurality of BS (300-*n*)
is solar enabled.

At step 204: A controller (102) at the core network (800)
enables each of the energy exchange between one BS (300)
with other BSs (300-*n*). The controller (102) is also config-
ured for cooperatively adjusting network coverage area for
each of the BS (300) of the plurality of BSs (300-*n*).

At step 206: The controller (102) selectively activates an
energy cooperation (EC) model or an Energy Cooperation
and Coverage Adjustment (ECCA) model.

Description of the method (200) is similar to the system
(100) for providing energy management in the communica-
tion network (700) as detailed above and hence is not
repeated for the sake of brevity.

Now referring to FIG. 3, FIG. 3 illustrates a flowchart
(900) of an exemplary Energy Cooperation (EC) model.

Here again referring to FIG. 1 in combination with FIG. 3,
at step 902: The controller (102) monitors the energy con-
sumption for each of the BS (300).

At step 904: The controller (102) performs detection of
the energy deficient base station, if the energy deficient base
station is detected, then the step 906 is executed, else step
912 is executed.

At step 906: In case the energy deficient base station is
detected, the controller (102) generates a request to receive
the shareable energy from other base stations (300-*n*) (en-
ergy sufficient base station).

At step 908: The controller (102) performs decision of
detecting, if the base station is still energy deficient. In case
the base station is still detected as energy deficient, a step
910 is executed, else step 902 is executed.

At step 910: In case the base station is still detected as
energy deficient, the controller (102) generates a request to
procure deficit energy from the power grid (600).

At step 912: In case the base station is not detected as an
energy deficient, the controller (102) computes an amount of
a sharable energy.

At step 914: The controller (102) identifying a surplus
energy in the core network (800).

At step 916: The controller (102) transfers the surplus
energy to the power grid (600).

In an exemplary embodiment, the system (100) enables
telecom service providers to cooperatively use renewable
energy resource and aid reduced usage of energy from power
grid, which also results in achieving carbon footprint reduc-
tion as well as monetary gains by following cooperative
energy exchange in a mature operational scenario. The
operator revenue computation involving the revenue metrics
are as below:

Capital Expenditure (CAPEX): CAPEX is a cost incurred
upon a cellular network or core network (800) operator or
service provider while setting up the network (communica-
tion network as discussed above). CAPEX includes the cost
of installing BSs (300) and solar-dimensioning. For the
network having B BSs, each BS equipped with $N_s$ solar
panels and $N_B$ batteries, with cost of solar panels (400) per
BS to be $C_s$ and the cost of batteries (500) per BS to be $C_B$,
the CAPEX is computed as:

$$CAPEX = B(C_s N_s + C_B N_B) + C_0.$$

$C_0$ refers to other one-time capital expenditure involved in
setting up the BSs and network architecture.

Operational Expenditure (OPEX): OPEX is a cost
incurred upon the operator or service provider to run the BSs
(300) without any power outage. The daily cost to buy
energy from the power-grid (600) to avoid an energy outage
may be computed as:

$$OPEX = \sum_{t=1}^{24}\sum_{b=1}^{B} c_{buy} D_b(t)$$

Here, B refers to the number of BSs in the network, $c_{buy}$
refers to the cost of buying unit energy from the power grid
(600), and $D_b$ (t) refers to the amount of deficit energy
needed by BS b at hour t.

Energy sharing cost($C_{sh}$): Energy sharing cost refers to a
cost incurred in the energy sharing process through the
proposed system (100) and the method (200) providing the
proposed EC model for sharing the energy between the
energy surplus BS (energy efficient BS) and the energy
deficient BS. Energy sharing cost is given as:

$$C_{sh} = \sum_{t=1}^{24}\sum_{b=1}^{B} \vartheta E_S^b(t)$$

Here, $\vartheta$ represents the unit energy sharing cost and a (t) refers to the amount of energy shared by BS b at hour t. Energy sharing costs are needed in order to maintain the power-grid infrastructure. Hence it may be considered as cost borne by the operator for grid maintenance.

Revenue by selling energy($R_s$): Revenue by selling energy refers to the revenue earned by the operator or by the service provider by selling the surplus energy back to the power grid (600). Revenue by selling energy is computed as:

$$R_S = \sum_{t=1}^{24}\sum_{b=1}^{B} r_S S_b(t).$$

Here, $r_s$ is the unit energy selling cost and $S_b$ (t) refers to the amount of energy sold by BS b to the power grid (600) at hour t.

Revenue earned by serving users($R_{serv}$): Revenue earned by serving users refers to the revenue earned by the network operator or by the service provider in serving users. Revenue earned by serving users is computed as:

$$R_{serv} = \sum_{t=1}^{24}\sum_{b=1}^{B} \varepsilon U_b(t).$$

Here $\varepsilon$ is the revenue earned by serving a user and $U_b$ (t) is the number of users being served BS b at hour t.

Thus, the net profit earned by the network operator is computed as:

$$\text{Profit} = R_{serv} + R_S - C_{sh} - \text{OPEX} - \text{CAPEX}.$$

Therefore, the system (100) enables the service provider to sell and buy energy, in addition to share energy over the smart grid, by enabling the cooperative energy sharing which in turn optimizes the energy cost of operations and remains capable of handling spatio-temporal variations.

Figure 4:
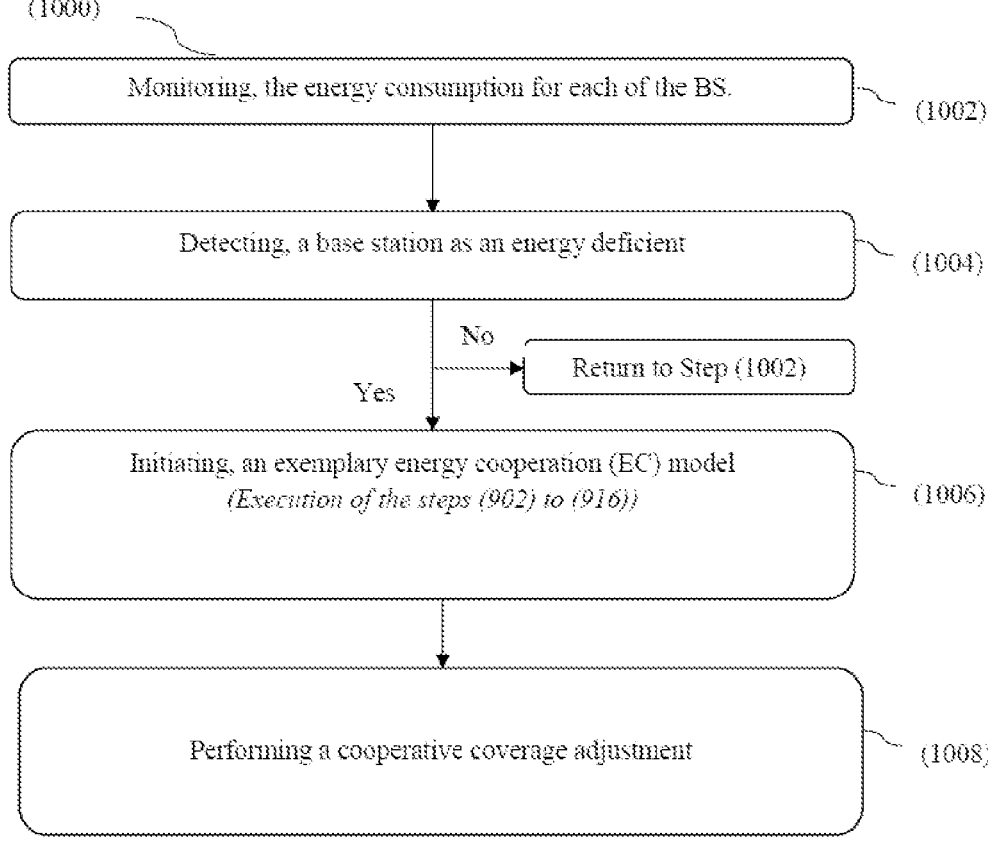
FIG. 4 illustrates a flowchart for an exemplary Energy Cooperation and Coverage Adjustment (ECCA) model, in accordance with different embodiments of the invention.

In accordance with an embodiment, FIG. 4 illustrates a flowchart (1000) for an exemplary Energy Cooperation and Coverage Adjustment (ECCA) enabled through the system (100) and the method (200). Here again referring to FIG. 1 in combination with FIG. 3 and FIG. 4, at step 1002: The controller (102) monitors the energy consumption for each of the BS (300).

At step 1004: The controller (102) performs detection of the energy deficient base station, if the energy deficient base station is detected, step 1006 is executed, else step 1002 is executed.

At step 1006: The controller (102) initiates an exemplary energy cooperation (EC) model by executing the steps (902) to (916).

At step 1008: In case, the energy deficient base station is still detected, the controller (102) performs the cooperative coverage adjustment.

The joint ECCA involves cooperative energy sharing through the EC model followed by the cooperative coverage adjustment by the Radio Network Controller (RNC) to mitigate the cellular effects of traffic-energy imbalances. The EC model is facilitated by the proposed system (100) and the method (200) for improving utilization of renewable energy resource and reduce grid consumption. Further, the joint ECCA performs resizing of the coverage network or readjusting coverage network. Thus, the system (100) gives good network performance at low-skewed traffic regime. The EC model (as shown in FIG. 3) is operated jointly with the cooperative coverage adjustment (ECCA model or strategy) to maintain network performance in terms of user service at high-skewed traffic regime.

The cooperative coverage adjustment followed by energy sharing results in minimal targeted or selective coverage adjustment. A lesser coverage adjustment from the originally planned BS (300) coverages at the network design phase will ensure more reliable coverage in the network (especially, in shadowing-prone cellular coverage regions). Thus, results into a better user service management in the network coupled with minimization of grid procurement.

At any time, after cooperative energy transfer, if any one of the BS (300) in the cluster is still unable to meet the QoS requirements of all its associated users, then the neighbouring BSs (300) that are low on traffic and high on energy availability expand their coverage areas to meet the QoS of the users may be served earlier. The BS (300) which was subjected to higher traffic intensity reduces its coverage area so as to guarantee QoS to a reduced number of associated users.

In an another exemplary embodiment, in referring to FIG. 2, FIG. 3 and FIG. 4, a method providing cooperative energy sharing comprises a plurality of the Base Stations (BSs) (300-*n*) connected to a power grid (600) and a core network (800) configured in the communication network (700), wherein each BS of the plurality of BSs (300) is solar enabled.

The core network (800) comprises a controller (102) configured for enabling energy exchange among energy-deficient BS from the plurality of BS and energy-sufficient BS from the plurality of BS through the power grid (600). The controller (102) is also configured for adjusting network coverage area for each of the BS of the plurality of BSs (300), wherein the energy sharing comprises buying, selling and sharing of energy among the plurality of BSs (300).

The controller (102) computes revenue for a network operator based on energy exchange. The computing is based on calculating, cost incurred upon the network operator while setting up the communication network. The cost incurred comprises cost of installing plurality of BSs and installing solar panels and batteries within the plurality of BSs. Further, a cost is calculated upon the network operator for running the plurality of BSs without outage of energy. The cost comprises cost of buying unit energy from the grid and amount of deficit energy needed by the BS at a particular hour. Thereafter, a decrease in the cost is detected which is incurred upon the network operator according to a revenue earned after the energy exchange. The revenue is used for determining a net profit earned by the network operator. The carbon footprint generated by the plurality of BSs gets reduced through the cooperative energy exchange.

Exemplary embodiments discussed above may provide certain advantages. Though not required to practice aspects of the disclosure, the advantages may include those provided by the following features.

Some embodiment of the system (100) is deployable into the existing power grid (600) infrastructure by establishing backhaul links between the BSs (300) and core network. Thus, the system is cost effective.

Some embodiments of the system (100) and method (200) improve utilization of network energy and reduce the power grid (600) consumption.

Some embodiment of the system (100) ensures seamless service to the users, because of improved utilization of the network resources and without any extra infrastructure costs. Thus, the system (100) can lead to self-sustainable dual-powered network.

The invention claimed is:

1. A system providing energy management in a dual-powered communication network, the system comprising:
a plurality of a spatially distributed Base Stations (BSs) connected to a power grid and a core network configured in the communication network, wherein each spatially located BS of the plurality of BSs is solar enabled, and wherein each spatially located BS of the plurality of BSs is equipped with a plurality of batteries for energy storage capability,
wherein an operator-predefined critical battery level is defined as a minimum battery level which the BS is constrained to maintain at all times to avert energy outage,
wherein a spatially located BS harvests solar energy temporally into its storage battery, and a spatially located BS experiences temporally varying load due to spatial and temporal user dynamics in a geographical area,
wherein the battery storage level associated with one of the spatially located BS of the plurality of BSs is computed temporally as a difference of the BS energy harvest and BS load, and the battery storage level is constrained to be above an operator predefined critical value at all times,
wherein the temporal energy harvest at one of the spatially located BS of the plurality of BSs may be greater than or lesser than the temporal BS load; wherein this phenomenon when seen for a plurality of spatially distributed BSs, results in spatio-temporal dynamics in BS load and BS energy harvest in a considered system,
wherein each BS supplies energy from its storage battery to serve the temporal BS load,
wherein one of the spatially located BS of the plurality of BSs is termed to be energy-deficient in an event that the BS is unable to meet its temporal load with the temporal energy stored in its battery storage, effectively resulting in the battery level going below a predefined operator threshold,
wherein one of the spatially located BS of the plurality of BSs is termed to be energy-sufficient in an event that the BS is able to meet its temporal load with the temporal energy stored in its battery storage, resulting in the battery level being sufficiently above the predefined operator threshold,
wherein the spatially located energy-deficient BSs involve in cooperative energy transfer with the grid networked energy-sufficient BSs through the power grid, or directly purchase energy from the power grid, thereby averting energy outage,
wherein the spatially located energy-sufficient BSs involve in cooperative energy transfer with the grid networked energy-deficient BSs through the power grid, or directly sell energy to the power grid, wherein, the core network comprises of a controller for monitoring the temporal BS load and temporal energy harvest at all spatially distributed BSs,
wherein the core network comprises a controller configured for enabling energy transfer among energy-deficient BS from the plurality of BS and energy-sufficient BS from the plurality of BS cooperatively through the power grid, wherein the controller is also configured for adjusting network coverage area for each of the BS of the plurality of BSs.

2. The system as claimed in claim 1, wherein each of the BS when solar enabled comprises a plurality of batteries having a net finite storage capacity for storing energy and a plurality of solar panels for harvesting energy, wherein the controller is configured to control energy exchange or energy transfer cooperatively among the energy-deficient BSs and the energy-sufficient BSs depending on the spatio-temporally varying stochastic energy harvest and a stochastic BS traffic load,
wherein an operator predefined critical battery level is defined as the minimum battery level which the BS is constrained to maintain at all times to avert energy outage,
wherein an amount of net energy required by the energy-deficient BS to avert energy outage comprises the difference between the temporal energy harvest and the temporal BS load relative to the operator predefined critical battery level threshold, is termed as deficit energy required by an energy-deficient BS,
wherein the amount of net energy transferred by an energy-sufficient BS is computed relative to the operator predefined critical threshold value as the difference between the temporal energy harvest and the temporal BS load, a total storage capacity level, termed as a sharable energy with the energy-sufficient BS.

3. The system as claimed in claim 2, wherein the BS is configured for:
receiving, through the power grid, the deficit energy from the energy-deficient BSs when the stored energy is lower than the predefined critical battery threshold, when the temporal BS load being higher than the temporal energy harvest; and
transferring, through the power grid, the energy to other BSs when the sharable energy is higher than the predefined critical battery threshold;
selling, through the power grid, the energy to the power grid, when the sharable energy is leftover with the energy-sufficient BS after involving in cooperative energy transfer and/or cooperative coverage adjustment.

4. The system as claimed in claim 2, wherein the energy exchange comprises one of transferring energy from the energy-sufficient BSs to other BSs in the communication network, or receiving energy from the energy-sufficient BSs to other BSs in the communication network.

5. The system as claimed in claim 1, wherein the controller is configured for:
monitoring spatio-temporal variation of a traffic at each of the BS in the communication network; and
cooperatively adjusting, the network coverage for each of the BS according to a spatio-temporally varying traffic intensity and availability of energy stored in the BS, wherein the adjusting or a load balancing comprises one of an increasing the coverage area or decreasing the coverage area; and
cooperatively transferring or balancing energy from the energy-sufficient BSs to the grid networked energy-deficient BSs in the communication network,
wherein cooperative coverage adjustment follows the cooperative energy transfer among the grid networked BSs.

6. The system as claimed in claim 1, wherein the controller is configured for:

monitoring, in case energy stored in the BS is energy-sufficient;

receiving, request for sharing energy by the energy-sufficient BSs in the communication network, wherein the request is generated when a BS is energy-deficient, wherein the communication network comprises one of a similar communication network for other BSs requesting for sharing energy and BS transferring the energy, or a different communication network for the other BS requesting for sharing energy and the BS transferring the energy;

transferring, energy by the energy-sufficient BS to other BSs; and selling, energy by the energy-sufficient BS to the power grid.

7. The system as claimed in claim 1, wherein the controller is configured for:

monitoring, energy consumption for each of the BS, wherein the energy consumption comprises a dynamic energy consumption for serving an associated user and a static energy consumption for running the BS;

the controller is also configured for determining a battery level of the BS according to the BS energy consumption and stochastic energy harvest;

wherein the BS is identified to be the energy-deficient BS in case the battery level of the BS is detected below the predefined critical battery threshold value while fulfilling a user Quality of Service (QOS), and the BS is identified to be the energy-sufficient BS in case the battery level of the BS is detected between the predefined critical battery threshold value and a total storage capacity level of the BS after fulfilling the user QOS, wherein the predefined critical battery threshold value of storage capacity is subjectively chosen by the operator depending or service provider on a number of battery charging-discharging cycles and a depth of discharge.

8. The system as claimed in claim 1, wherein the communication network comprises one of a 3G network, a 4G network, and a 5G network, wherein for the 3G network the controller comprises a Radio Network Controller (RNC) configured as an operative part of a Operation Maintenance Center (OMC) and the plurality of BSs are clustered, wherein for the 4G network an evolved packet core (EPC) is an operative part of the OMC and a pluralities of BSs comprising eNBs (evolved NodeBs) are clustered, and wherein for the 5G network a Radio Access Networks (RAN) is an operative part of the OMC and a plurality of the BSs comprising gNodeB or gNB are clustered.

9. A method providing energy management in a dual-powered communication network, the method comprising:

configuring, a plurality of a spatially distributed Base Stations (BSs) connected to a power grid and a core network in the communication network, wherein each BS of the plurality of BS is solar enabled, and wherein each spatially located BS of the plurality of BSs is equipped with a plurality of batteries for energy storage capability, wherein an operator-predefined critical battery level is defined as a minimum battery level which the BS is constrained to maintain at all times to avert energy outage, wherein a spatially located BS harvests solar energy temporally into its storage battery, and a spatially located BS experiences temporally varying load due to spatial and temporal user dynamics in a geographical area, wherein the battery storage level associated with one of the spatially located BS of the plurality of BSs is computed temporally as a difference of the BS energy harvest and BS load, and the battery storage level is constrained to be above an operator predefined critical value at all times, wherein the temporal energy harvest at one of the spatially located BS of the plurality of BSs may be greater than or lesser than the temporal BS load; wherein this phenomenon when seen for a plurality of spatially distributed BSs, results in spatio-temporal load-energy imbalance in a considered system, wherein each BS supplies energy from its storage battery to serve the temporal BS load, wherein one of the spatially located BS of the plurality of BSs is termed to be energy-deficient in an event that the BS is unable to meet its temporal load with the temporal energy stored in its battery storage, effectively resulting in the battery level going below a predefined operator threshold, wherein one of the spatially located BS of the plurality of BSs is termed to be energy-sufficient in an event that the BS is able to meet its temporal load with the temporal energy stored in its battery storage, resulting in the battery level being sufficiently above the predefined operator threshold, wherein the spatially located energy-deficient BSs involve in cooperative energy transfer with a grid networked energy-sufficient BSs through the power grid, or directly purchase energy from the power grid, thereby averting energy outage, wherein the spatially located energy-sufficient BSs involve in cooperative energy transfer with the grid networked energy-deficient BSs through the power grid, or directly sell energy to the power grid, wherein, the core network comprises of a controller for monitoring the temporal BS load and temporal energy harvest at all spatially distributed BSs, enabling, through a controller at the core network, each of energy among energy-deficient BS from the plurality of BS and energy-sufficient BS from the plurality of BS through the power grid, wherein the controller is also configured for adjusting network coverage area for each of the BS of the plurality of BSs.

10. The method as claimed in claim 9, wherein comprising:

controlling, through the controller, to control energy exchange or energy transfer cooperatively among the energy-deficient BSs and the energy-sufficient BSs depending on the spatio-temporally varying stochastic energy harvest and a stochastic BS traffic intensity or load, wherein an operator predefined critical battery level is defined as the minimum battery level which the BS is constrained to maintain at all times to avert energy outage, wherein an amount of net energy required by the energy-deficient BS to avert energy outage comprises the difference between the temporal energy harvest and the temporal BS load relative to the operator predefined critical battery level threshold, is termed as deficit energy required by an energy-deficient BS, wherein the amount of net energy transferred by an energy-sufficient BS BS is computed relative to the operator predefined critical threshold value as the difference between the temporal energy harvest and the temporal BS load, a total storage capacity level, termed as a sharable energy with an energy-sufficient BS.

11. The method as claimed in claim 10, comprising:

receiving, through the power grid, the deficit energy from the energy-deficient BSs when the stored energy is lower than the predefined critical battery threshold when the temporal BS load being higher than the temporal energy harvest; and transferring, through the power grid, the energy to other BSs when the sharable energy is higher than the predefined critical battery threshold;

selling, through the power grid, the energy to the power grid, when the sharable energy is leftover with the energy-sufficient BS after involving in cooperative energy transfer and/or cooperative coverage adjustment.

12. The method as claimed in claim 10, wherein the energy exchange comprises one of transferring energy from the energy-sufficient BSs to other BSs in the communication network, or receiving energy from the energy-sufficient BSs to other BSs in the communication network.

13. The method as claimed in claim 9, comprising:

monitoring spatio-temporal variation of a traffic at each of the BS in the communication network; and cooperatively adjusting, the network coverage for each of the BS according to the spatio-temporally varying traffic intensity and availability of energy stored in the BS, wherein the adjusting or a load balancing comprises one of an increasing the coverage area or decreasing the coverage area,; and cooperatively transferring or balancing energy from the energy-sufficient BSs to the grid networked energy-deficient BSs in the communication network, wherein cooperative coverage adjustment follows the cooperative energy transfer among the grid networked BSs.

14. The method as claimed in claim 9, comprising:

monitoring, in case energy stored in the BS is energy-sufficient;

receiving, request for sharing energy by the energy-sufficient BSs in the communication network, wherein the request is generated when a BS is energy-deficient, wherein the communication network comprises one of a similar communication network for other BSs requesting for sharing energy and BS transferring the energy, or a different communication network for the other BSs requesting for sharing energy and the BS transferring the energy; and transferring, energy by the energy-sufficient BS to other BSs; and selling, energy by the energy-sufficient BS to the power grid.

15. The method as claimed in claim 9, comprising:

monitoring, through the controller, energy consumption for each of the BS, wherein the energy consumption comprises a dynamic energy consumption for serving an associated user and a static energy consumption for running the BS;

determining, through the controller, a battery level of the BS according to the BS energy consumption and stochastic energy harvest;

wherein the BS is identified to be the energy-deficient BS in case the battery level of the BS is detected below the predefined critical battery threshold value while fulfilling a user Quality of Service (QOS), and the BS is identified to be the energy-sufficient BS in case the battery level of the BS is detected between the predefined critical battery threshold value and a total storage capacity level of the BS after fulfilling the user QOS, wherein the predefined critical battery threshold value of storage capacity is subjectively chosen by the operator depending or service provider on a number of battery charging-discharging cycles and a depth of discharge.

16. A method providing cooperative energy sharing and adjusting network coverage, the method comprising:

a plurality of a spatially distributed Base Stations (BSs) connected to a power grid and a core network configured in a communication network, wherein each BS of the plurality of BSs is solar enabled, and wherein each spatially located BS of the plurality of BSs is equipped with a plurality of batteries for energy storage capability, wherein an operator-predefined critical battery level is defined as a minimum battery level which the BS is constrained to maintain at all times to avert energy outage, wherein a spatially located BS harvests solar energy temporally into its storage battery, and a spatially located BS experiences temporally varying load due to spatial and temporal user dynamics in a geographical area, wherein the battery storage level associated with one of the spatially located BS of the plurality of BSs is computed temporally as a difference of the BS energy harvest and BS load, and the battery storage level is constrained to be above an operator predefined critical value at all times, wherein the temporal energy harvest at one of the spatially located BS of the plurality of BSs may be greater than or lesser than the temporal BS load; wherein this phenomenon when seen for a plurality of spatially distributed BSs, results in spatio-temporal load-energy imbalance in a considered system, wherein each BS supplies energy from its storage battery to serve the temporal BS load, wherein one of the spatially located BS of the plurality of BSs is termed to be energy-deficient in an event that the BS is unable to meet its temporal load with the temporal energy stored in its battery storage, effectively resulting in the battery level going below a predefined operator threshold, wherein one of the spatially located BS of the plurality of BSs is termed to be energy-sufficient in an event that the BS is able to meet its temporal load with the temporal energy stored in its battery storage, resulting in the battery level being sufficiently above the predefined operator threshold, wherein the spatially located energy-deficient BSs involve in cooperative energy transfer with the grid networked energy-sufficient BSs through the power grid, or directly purchase energy from the power grid, thereby averting energy outage, wherein the spatially located energy-sufficient BSs involve in cooperative energy transfer with the grid networked energy-deficient BSs through the power grid, or directly sell energy to the power grid, wherein, the core network comprises of a controller for monitoring the temporal BS load and temporal energy harvest at all spatially distributed BSs, wherein the core network comprises a controller configured for enabling energy transfer among energy-deficient BS from the plurality of BS and energy-sufficient BS from the plurality of BS cooperatively through the power grid, wherein the controller is also configured for adjusting network coverage area for each of the BS of the plurality of BSs, wherein the energy sharing comprises sharing of energy among the plurality of BSs.

17. The method as claimed in claim 16, comprising:

computing, revenue for a network operator based on energy exchange, wherein the computing comprising:

calculating, cost incurred upon the network operator while setting up the communication network, wherein the cost incurred comprises cost of installing plurality of BSs and installing solar panels and batteries within the plurality of BSs;

calculating, cost incurred upon the network operator for running the plurality of BSs without outage of energy, wherein the cost comprises cost of buying unit energy from the grid and amount of deficit energy needed by the BS at a particular hour;

identifying, a decrease in the cost incurred upon the network operator according to a revenue earned after the energy exchange, wherein the revenue is used for determining a net profit earned by the network operator.

\*　\*　\*　\*　\*